United States Patent [19]
Pritchard

[11] Patent Number: 5,950,493
[45] Date of Patent: Sep. 14, 1999

[54] GEAR SHIFT TOWER ASSEMBLY

[75] Inventor: Larry A. Pritchard, Macomb, Mich.

[73] Assignee: New Venture Gear, Inc., Troy, Mich.

[21] Appl. No.: 08/984,509

[22] Filed: Dec. 3, 1997

[51] Int. Cl.[6] .......................... B60K 20/04; F16H 59/04; G05G 5/05
[52] U.S. Cl. ........................................................ 74/473.33
[58] Field of Search .......................... 74/473.33; 267/150

[56] References Cited

U.S. PATENT DOCUMENTS 5,357,823  10/1994  Parsons .
5,592,856   1/1997  Parsons .
5,651,293   7/1997  Ebenstein .

Primary Examiner—Tamara L. Graysay
Assistant Examiner—Debra Belles
Attorney, Agent, or Firm—Harness, Dickey & Pierce, P.L.C.

[57] ABSTRACT

A gear shift tower assembly for a manual transmission of a motorized vehicle having a housing adapted to be secured to the manual transmission, a gimbal pivotally coupled to the housing for rotation about a first axis, a shift lever pivotally coupled to the gimbal for rotation about a second axis, and a centering mechanism for biasing the shift lever to a centered position relative to the housing is disclosed. The centering mechanism includes a camming surface formed on the gimbal and a spring-biased follower operably coupled to the housing and engaging the camming surface to urge the shift lever toward a desired position.

19 Claims, 2 Drawing Sheets

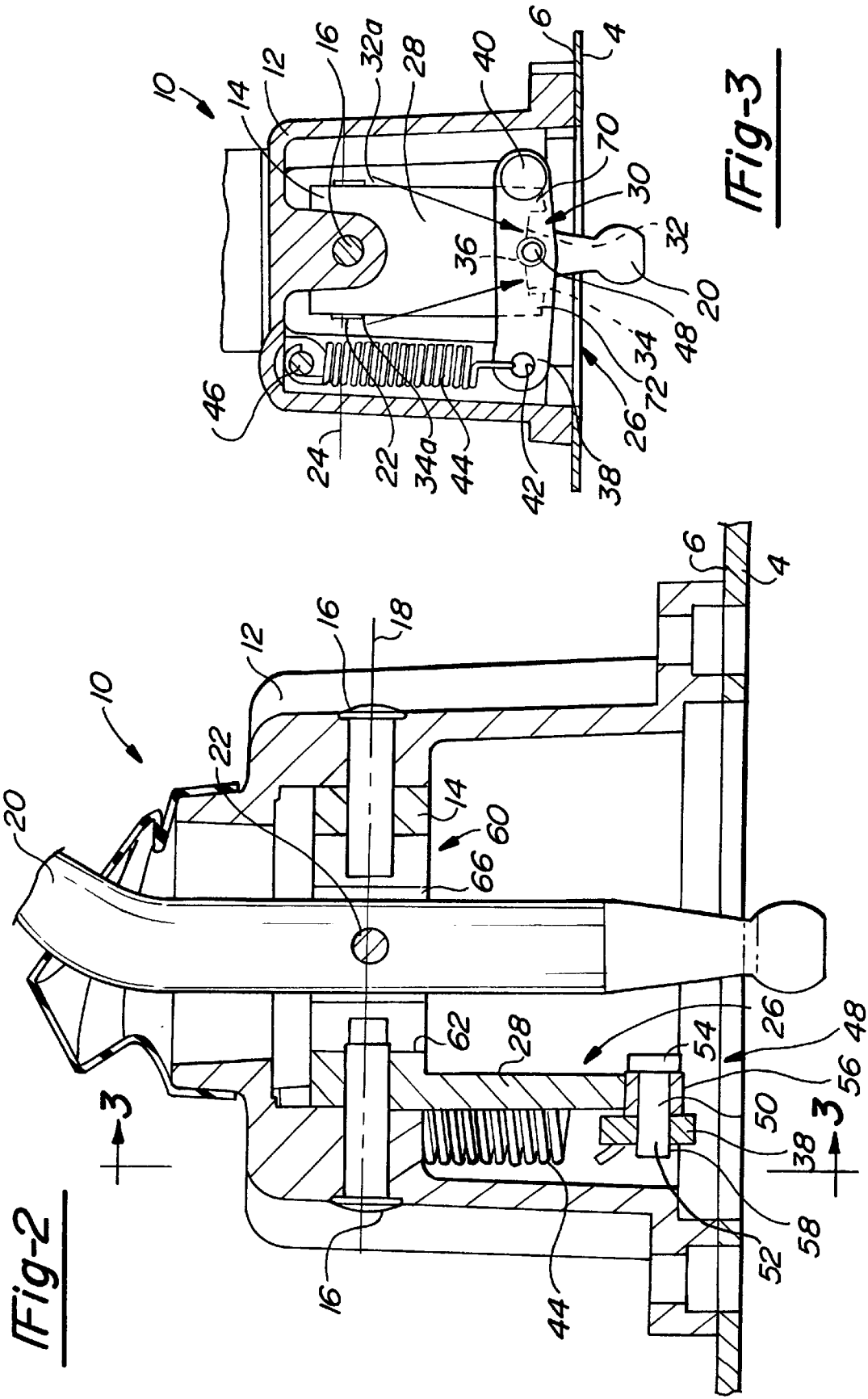

GEAR SHIFT TOWER ASSEMBLY

BACKGROUND OF THE INVENTION

The present invention relates generally to a gear shift for a manual transmission of a motorized vehicle and, more specifically, to a gear shift tower assembly having a spring-biased centering mechanism for positively positioning the shift lever in a desired location.

Conventional manual transmissions are equipped with a gear shift assembly which permits a vehicle operator to selectively shift between various forward ratio gears and a reverse gear. The gear shift assembly includes a tower housing secured to an exterior surface of the transmission casing and a gear shift lever that is operably coupled to a socket and shift rail in the transmission. Typically, the gear shift assembly has a standard shift pattern such that the shift lever is movable along a neutral cross-over path to a plurality of preselected gate positions. Each gate position defines a linear shift plane for a pair of ratio gears. Most commonly, the gate position located at one end of the neutral cross-over path defines the linear shift plane between the first and second forward gears, or the 1-2 shift plane, the gate position located in the center of the neutral cross-over path defines the shift plane between the third and fourth forward gears, or the 3-4 shift plane, and the gate position at the opposite end of the neutral cross-over path defines a shift plane between the fifth forward ratio gear and the reverse gear position, or the 5-R shift plane.

Gear shift levers incorporate various mechanisms to positively position the shift lever in a desired position. For example, a spring member may be operably connected to the gear shift lever of the gear shift tower assembly to bias the shift lever. As such, the spring mechanism generates a return force that acts directly on the shift lever for biasing the shift lever to a center position. However, gear shift assemblies of this type have proven to be difficult to provide a smoothly operating mechanism or to provide a substantially constant centering force.

SUMMARY OF THE INVENTION

The present invention is therefore directed to overcome the disadvantages commonly associated with the prior art gear shift tower assemblies by providing a centering mechanism which provides a substantially constant centering force irrespective of the off-center positioning of the shift lever. In accordance with the present invention, the preferred embodiment of the gear shift tower assembly for selecting a gear ratio of a manual transmission in a motorized vehicle comprises a housing, a gimbal pivotally coupled to the housing, a shift lever pivotally coupled to the gimbal, and a centering mechanism including a camming surface formed on the gimbal, a spring-biased cam lever operably coupled to the housing, and a follower disposed on the cam lever to engage the camming surface.

The kinematic relationship between the camming surface and the follower is such that the centering mechanism provides a substantially constant centering force independent of the angular position of the gimbal relative to the housing. More specifically, the camming surface includes a pair of arcuate surfaces which intersect to form a detent for receiving the follower when the shift lever is located in a centered position. Therefore, the present invention allows for improved shift lever packaging and operator convenience when used with a conventional manual transmission. Moreover, the return force provided by the centering mechanism is substantially constant irrespective of the position of the shift lever relative to the housing.

Additional advantages and features of the present invention will become apparent from the following description and appended claims taken in conjunction with the accompanying drawings.

BRIEF DESCRIPTION OF THE DRAWINGS

FIG. 2 is a partial cross-sectional view showing the gear shift tower assembly of FIG. 1; and FIG. 3 is a partial cross-sectional view taken along line 3—3 illustrated in FIG. 2 and showing the detent mechanism of the present invention.

DETAILED DESCRIPTION OF THE PREFERRED EMBODIMENT

Figure 1:
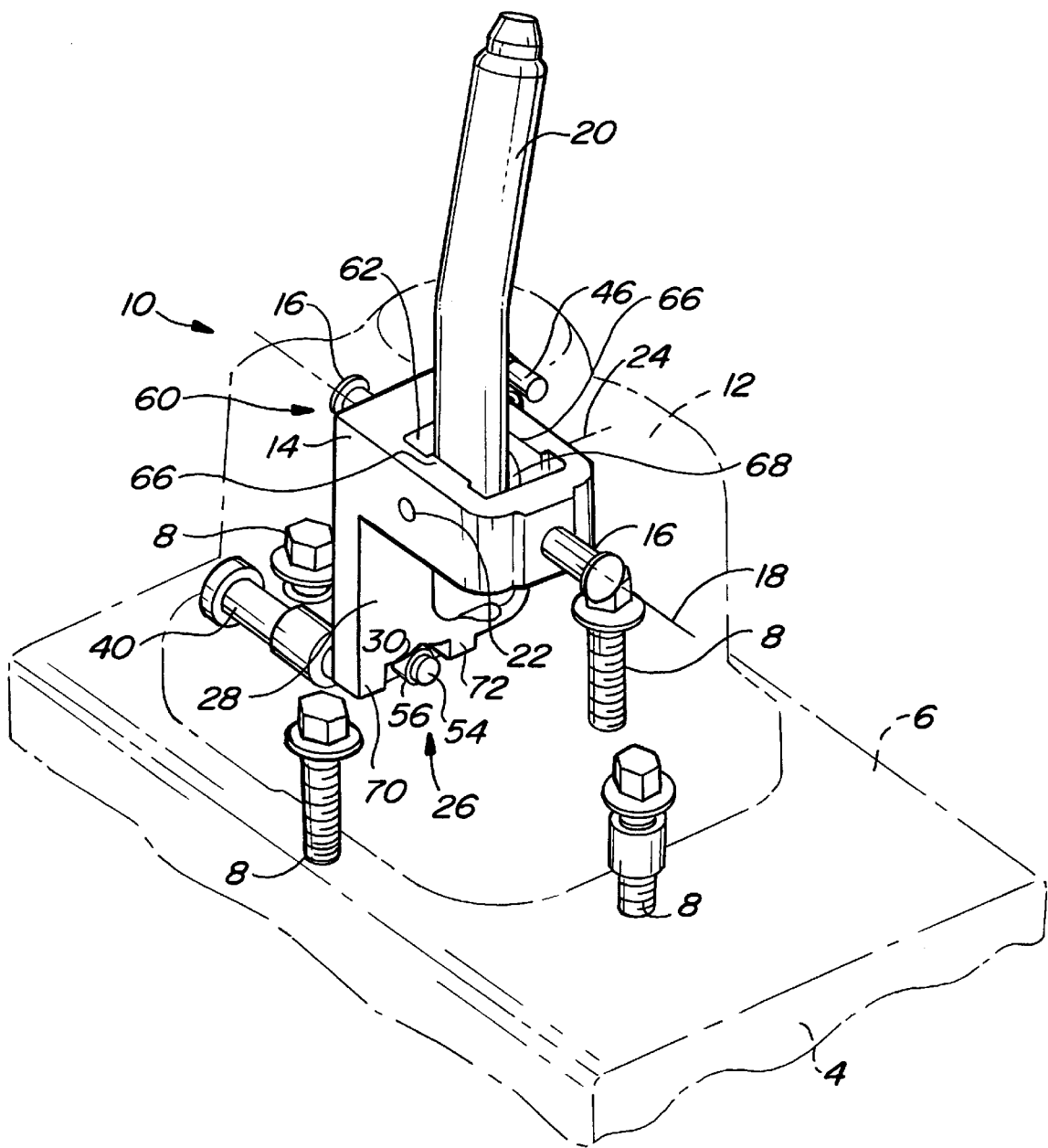
FIG. 1 is a perspective view of the gear shift tower assembly constructed according to a preferred embodiment of the present invention with the housing shown in phantom lines.

In general, the present invention is directed to a gear shift tower assembly 10 of the type which permits a vehicle operator to selectively shift a multi-speed manual transmission. Referring to the drawings, the preferred embodiment of gear shift tower assembly 10 includes a housing 12, a gimbal 14 pivotally coupled to housing 12 by a pair of gimbal pins 16 for rotation relative to housing 12 about a first rotational axis 18 defined by gimbal pins 16. Housing 12 is adapted to be secured to an exterior surface 6 of a transmission casing 4 by threaded fasteners 8 in a manner well known in the art. Gear shift tower assembly 10 further includes a shift lever 20 coupled to gimbal 14 by a hinge pin 22 for rotation about a second rotational axis 24 defined by hinge pin 22. A centering mechanism 26 generates a return force for centering gimbal 14. This return force is substantially constant irrespective of the rotational position of gimbal 14 relative to housing 12. While the preferred embodiment of the present invention positions shift lever 20 in a centered position, one skilled in the art would recognize that the present invention includes a mechanism which positions shift lever 20 in a desired, albeit off-center, position.

Centering mechanism 26 includes a vertical flange 28 extending downwardly from gimbal 14 and terminating with a camming surface 30. Camming surface 30 includes a first arcuate surface 32 and a second arcuate surface 34 which intersect to define a detent 36. The center of curvature for first arcuate surface 32 is designated as 32a, and the center of curvature for second arcuate surface 34 is designated as 34a. As such, centers 32a, 34a are offset from first rotational axis 18. As presently preferred, first and second arcuate surfaces 32, 34 are constant radius surfaces which are mirror images of one another. However, one skilled in the art would readily recognize that other arcuate configurations could be utilized without deviating from the scope of the present invention.

Centering mechanism 26 further includes a cam lever 38 having a first end pivotally connected to housing 12 by a pin 40. An aperture 42 is formed in a second end of cam lever 38 and receives a first end of a spring 44. A second end of spring 44 is operably coupled to housing 12 by a pin 46. A follower 48 is disposed on cam lever 38 and extends therefrom to engage camming surface 30 formed on vertical flange 28. More specifically, follower 48 includes a follower pin 50 having a shaft portion 52 and a head portion 54 formed thereon. A spring clip 58 is disposed on an end of shaft portion 52 opposite head portion 54 to retain follower 48 on cam lever 38. A bearing 56 is operably disposed between cam lever 38 and head portion 54 and rotates about shaft portion 52 to reduce the friction between follower 48 and camming surface 30.

Vertical flange 28 includes a first stop member 70 formed at the end of first arcuate surface 32 opposite detent 36. Similarly, a second stop member 72 is formed at the end of second arcuate surface 34 opposite detent 36. First and second stop members 70, 72 extend downwardly away from gimbal 14 to provide a positive mechanical stop at the end of the range of travel for follower 48.

Gimbal 14 includes an upper portion 60 which is substantially rectangular and has a rectangular bore 62 formed therethrough. Gimbal pins 16 extend through housing 12 and pivotally couple gimbal 14 to housing 12 for rotation about first rotational axis 18. As presently preferred, pins 16 extend past the inner wall surface defined by bore 62 to provide positive mechanical stops for rotational movement of shift lever 20 about hinge pin 22. Upper portion 60 of gimbal 14 includes a pair of bosses 66 formed on the inner wall of gimbal 14 adjacent hinge pin 22. Washers 68 are concentrically located around hinge pin 22 with each washer 68 operably disposed between one of bosses 66 and shift lever 20 to reduce the friction therebetween for providing smoother movement of shift lever 20.

With continued reference to all of the figures, the operation of gear shift tower assembly 10 will now be described. As previously discussed, gear shift tower assembly 10 is adapted to be used in combination with a manual transmission of a motorized vehicle. More particularly, gear shift tower assembly 10 is designed to be utilized with a five-speed manual transmission having a standard shift pattern such that shift lever 20 is movable along a neutral cross-over path to three distinct gate positions. As is conventional, each gate position defines a linear shift plane along which shift lever 20 can be moved for selectively establishing either of a pair of transmission gear ratios. The gate position at a first end of the neutral cross-over path defines a first (i.e., 1-2) shift plane permitting pivotal movement of shift lever 20 about hinge pin 22 for establishing first and second forward gear ratios. The gate position at the center of the neutral cross-over path defines a second (i.e. 3-4) shift plane permitting pivotal movement of shift lever 20 about hinge pin 22 for establishing third and fourth forward gear ratios. Finally, the gate position at a second end of the neutral cross-over path defines a third (i.e., 5-R) shift plane permitting pivotal movement of shift lever 20 about hinge pin 22 for establishing a fifth forward gear ratio and a reverse gear ratio. As presently preferred, the invention described and illustrated herein is utilized to provide a return or centering force which biases shift lever 20 toward the second, centered shift plane when the manual transmission is in the neutral cross-over path (i.e. not engaged within a given gear).

For example, when shift lever 20 is in the neutral cross-over path, centering mechanism 26 operates to position shift lever 20 in the second shift plane. More particularly, spring 44 biases the second end of cam lever 38 upwardly causing cam lever 38 to rotate in a clockwise direction (as seen in FIG. 3) for urging follower 48 into engagement with detent 36, thereby centering shift lever 20 in its second gate position for movement along the second shift plane. A lateral force applied to the upper end of shift lever 20 causes gimbal 14 to rotate about first axis 18. The applied lateral force overcomes the spring bias exerted on cam lever 38 to cause follower 48 to disengage detent 36 and move along camming surface 30. For example, with reference to FIG. 3, a rightwardly directed lateral force exerted on the top of shift lever 20 causes shift lever 20 to rotate in a clockwise direction causing follower 48 to disengage detent 36 and move along first arcuate surface 32. At its farthest position, follower 48 engages first stop member 70 to position shift lever 20 in the first shift plane such that the manual transmission may be shifted into either of the first or second forward gear ratios.

When the transmission is shifted out of the first or second forward gear and the lateral force is removed from shift lever 20, centering mechanism 26 urges shift lever 20 to move to the second shift plane. More specifically, spring 44 urges follower 48 into engagement with first arcuate surface 32 of camming surface 30 for causing gimbal 14 to rotate in a counter-clockwise direction, as viewed in FIG. 3. Shift lever 20 continues to rotate until follower 48 engages detent 36 such that shift lever 20 is positioned in the second shift plane. Gear shift tower assembly 10 operates in a similar manner when a leftwardly directed force is applied to and removed from shift lever 20.

One skilled in the art will readily appreciate that the magnitude of the centering force is determined by the kinematic relationship of first and second arcuate surfaces 32, 34 to cam lever 38 and follower 48, as well as the spring constant of spring 44. While the preferred embodiment illustrates a kinematic symmetry between first and second arcuate surfaces 32, 34, it should be understood that the present invention is not so limited. In this regard, different kinematic configurations could be used to provide a different tactile "feel" for an operator depending on the direction in which shift lever 20 is manipulated. For example, a higher effective spring rate could be utilized for positioning shift lever 20 in the first gate position thus indicating that the transmission was being downshifted. In addition, while the present invention has been disclosed with regard to centering mechanism 26 which is operable to position shift lever 20 between various shift planes, the present invention could also be adapted to provide a centering mechanism for the shift lever when it is positioned between the forward and rearward position associated with each shift plane, such as between first and second gear.

It will be appreciated that the gear shift lever of the present invention represents a significant improvement over the prior art. While a preferred embodiment of this gear shift tower assembly has been disclosed, it should be further appreciated that modifications may be made without departing from the scope of the present invention. In addition, while various components have been disclosed in an exemplary fashion, various other components may, of course, be employed. It is intended by the following claims to cover these and any other departures from these disclosed embodiments which fall within the true spirit of this invention.

What is claimed is:

1. A gear shift tower assembly for selecting a gear of a manual transmission utilized in a motorized vehicle comprising:

a housing;

a gimbal pivotally coupled to said housing for rotation relative to said housing about a first axis;

a shift lever pivotally coupled to said gimbal for rotation relative to said gimbal about a second axis; and a centering mechanism for generating a return force to urge said shift lever toward a desired position, said centering mechanism including a camming surface formed on said gimbal, a cam lever operably coupled to said housing, a follower disposed on said cam lever to engage said camming surface, and a spring assembly operably coupled to said cam lever to urge said follower into engagement with said camming surface.

2. The gear shift tower assembly of claim 1 wherein said camming surface includes a first arcuate surface and a second arcuate surface intersecting to define a detent, said shift lever being positioned in said desired position when said follower engages said detent.

3. The gear shift tower assembly of claim 1 wherein said first arcuate surface is a constant radius surface and said second arcuate surface is a constant radius surface.

4. The gear shift tower assembly of claim 3 wherein said first arcuate surface has a center of curvature which is offset from said first axis and said second arcuate surface has a center of curvature which is offset from said first axis.

5. The gear shift tower assembly of claim 4 wherein said second arcuate surface is a mirror image of said first arcuate surface.

6. The gearshift tower assembly of claim 2 wherein said camming surface further comprises a first stop member formed on said first arcuate surface opposite said detent and a second stop member formed on said second arcuate surface opposite said detent.

7. The gearshift tower assembly of claim 1 wherein said centering mechanism further comprises a flange extending from said gimbal and terminating at said camming surface.

8. The gearshift tower assembly of claim 1 wherein said follower comprises a follower pin extending from said cam lever and operable to engage said camming surface.

9. The gearshift tower assembly of claim 8 wherein said follower pin includes a shaft portion and an head portion, and said follower further comprises a bearing operably disposed over said shaft portion and captured between said cam lever and said head portion.

10. A gear shift tower assembly for selecting a gear of a manual transmission utilized in a motorized vehicle comprising:
    a housing;
    a gimbal including a bore formed therethrough to define an inner wall;
    a gimbal pin pivotally coupling said gimbal to said housing to permit rotation of said gimbal relative to said housing about a first axis;
    a shift lever operably disposed in said bore;
    a hinge pin pivotally coupling said shift lever to said gimbal to permit rotation of said shift lever relative to said gimbal about a second axis; and
    a centering mechanism including a flange extending from said gimbal and terminating at a camming surface, a cam lever having a first end pivotally coupled to said housing, a spring coupled to a second end of said cam lever, and a follower disposed on said cam lever to engage said camming surface, said spring biasing said cam lever such that said follower engages said camming surface to urge said shift lever toward a desired position.

11. The gear shift tower assembly of claim 10 wherein said camming surface includes a first arcuate surface and a second arcuate surface intersecting to define a detent, said shift lever being positioned in said desired position when said follower engages said detent.

12. The gearshift tower assembly of claim 11 wherein said camming surface further comprises a first stop member formed on said first arcuate surface opposite said detent and a second stop member formed on said second arcuate surface opposite said detent.

13. The gearshift tower assembly of claim 10 wherein said follower comprises a follower pin extending from said cam lever and operable to engage said camming surface.

14. The gearshift tower assembly of claim 13 wherein said follower pin includes a shaft portion and an head portion, and said follower further comprises a bearing operably disposed over said shaft portion and captured between said cam lever and said head portion.

15. The gearshift tower assembly of claim 10 wherein said gimbal pin extends through a rectangular portion of said gimbal into said bore to provide a stop for rotational movement of said shift lever about said second axis.

16. The gearshift tower assembly of claim 10 further comprising a boss formed on said inner wall of said gimbal adjacent said hinge pin.

17. The gearshift tower assembly of claim 16 further comprising a washer concentrically located about said hinge pin and operably disposed between said boss and said shift lever to reduce the friction therebetween.

18. A manual transmission assembly selectively shiftable into one of a plurality of forward gear ratios and a reverse gear ratio comprising:
    a transmission having a casing;
    a gear shift tower housing secured to said casing;
    a gimbal pivotally coupled to said housing for rotation relative to said housing about a first axis;
    a shift lever pivotally coupled to said gimbal for rotation relative to said gimbal about a second axis, said shift lever operable to selectively shift said transmission; and
    a centering mechanism generating a return force to urge said shift lever toward a desired position, said centering mechanism including a camming surface, a cam lever having a first end pivotally coupled to said housing, a spring coupled to a second end of said cam lever, and a follower disposed on said cam lever to engage said camming surface.

19. The manual transmission assembly of claim 18 further comprising:
    a flange extending from said gimbal and terminating at said camming surface;
    a first arcuate surface and a second arcuate surface formed on said camming surface and intersecting to form a detent, said detent defining said desired position; and
    a first stop member formed on said first arcuate surface opposite said detent and a second stop member formed on said second arcuate surface opposite said detent, said first stop member and said second stop member defining a range of travel for said follower.

* * * * *

UNITED STATES PATENT AND TRADEMARK OFFICE
CERTIFICATE OF CORRECTION

PATENT NO. : 5,950,493
DATED : SEPTEMBER 14, 1999
INVENTOR(S) : LARRY A. PRITCHARD

It is certified that error appears in the above-indentified patent and that said Letters Patent is hereby corrected as shown below:

ON THE TITLE PAGE, Under U.S. PATENT DOCUMENTS insert the following:

"2,407,840 09/1946 Leonard"
"3,401,574 09/1968 Doolittle"
"4,129,046 12/1987 Lemcke, Jr."
"4,458,549 07/1984 Tani et al."
"4,892,001 01/1990 Meyers et al."
"5,156,060 10/1992 Shirahama et al."
"5,301,568 04/1994 Kono"
"5,493,931 02/1996 Niskanen"

Column 5, line 28, claim 9, "an" should be --a--.

Column 6, line 10, claim 14, "an" should be --a--.

Signed and Sealed this

Thirteenth Day of June, 2000

Attest:

Q. TODD DICKINSON

*Attesting Officer*     *Director of Patents and Trademarks*